Figure 1:
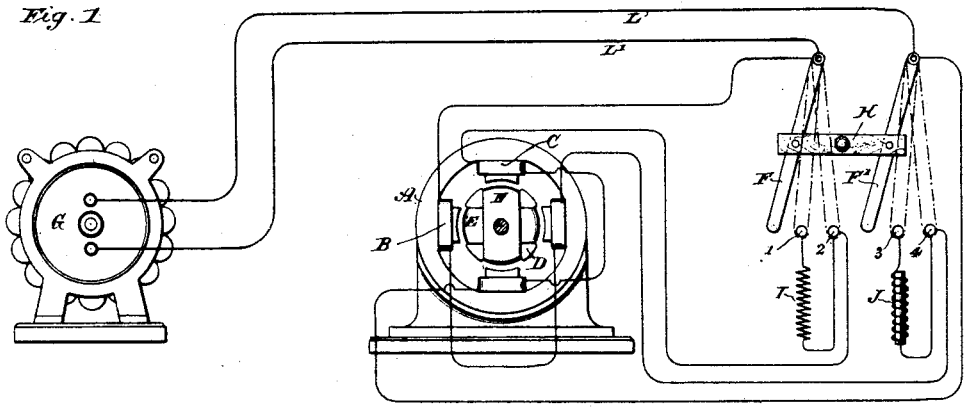

(No Model.)

N. TESLA.
METHOD OF OPERATING ELECTRO MAGNETIC MOTORS.

No. 401,520. Patented Apr. 16, 1889.

Witnesses:
Raphael Netter
Ernest Hopkinson

Inventor:
Nikola Tesla
by
Duncan, Curtis N Page.
Attorneys.

UNITED STATES PATENT OFFICE.

NIKOLA TESLA, OF NEW YORK, N. Y.

METHOD OF OPERATING ELECTRO-MAGNETIC MOTORS.

SPECIFICATION forming part of Letters Patent No. 401,520, dated April 16, 1889.

Application filed February 18, 1889. Serial No. 300,220. (No model.)

*To all whom it may concern:*

Be it known that I, NIKOLA TESLA, a subject of the Emperor of Austria, from Smiljan, Lika, border country of Austria-Hungary, and residing at New York, in the county and State of New York, have invented certain new and useful Improvements in Methods of Operating Electro-Magnetic Motors, of which the following is a specification, reference being had to the drawings accompanying and forming a part of the same.

As is well known, certain forms of alternating-current machines have the property, when connected in circuit with an alternating-current generator, of running as a motor in synchronism therewith; but, while the alternating current will run the motor after it has attained a rate of speed synchronous with that of the generator, it will not start it. Hence, in all instances heretofore where these "synchronizing-motors," as they are termed, have been run some means have been adopted to bring the motors up to synchronism with the generator, or approximately so, before the alternating current of the generator is applied to drive them. In some instances mechanical appliances have been utilized for this purpose. In others special and complicated forms of motor have been constructed. I have discovered a much more simple method or plan of operating synchronizing-motors, which requires practically no other apparatus than the motor itself. In other words, by a certain change in the circuit-connections of the motor I convert it at will from a double-circuit motor, or such as I have described in prior patents and applications, and which will start under the action of an alternating current into a synchronizing-motor, or one which will be run by the generator only when it has reached a certain speed of rotation synchronous with that of the generator. In this manner I am enabled to very greatly extend the applications of my system and to secure all the advantages of both forms of alternating-current motor.

The expression "synchronous with that of the generator," is used herein in its ordinary acceptation—that is to say, a motor is said to synchronize with the generator when it preserves a certain relative speed determined by its number of poles and the number of alternations produced per revolution of the generator. Its actual speed, therefore, may be faster or slower than that of the generator; but it is said to be synchronous so long as it preserves the same relative speed.

In carrying out my invention I construct a motor which has a strong tendency to synchronism with the generator. The construction which I prefer for this is that in which the armature is provided with polar projections. The field-magnets are wound with two sets of coils, the terminals of which are connected to a switch mechanism, by means of which the line-current may be carried directly through the said coils or indirectly through paths by which its phases are modified. To start such a motor, the switch is turned onto a set of contacts which includes in one motor-circuit a dead resistance, in the other an inductive resistance, and, the two circuits being in derivation, it is obvious that the difference in phase of the current in such circuits will set up a rotation of the motor. When the speed of the motor has thus been brought to the desired rate, the switch is shifted to throw the main current directly through the motor-circuits, and although the currents in both circuits will now be of the same phase the motor will continue to revolve, becoming a true synchronous motor. To secure greater efficiency, I wind the armature or its polar projections with coils closed on themselves. There are various modifications and important features of this method or plan; but the main principle of the invention will be understood from the foregoing.

Figure 2:
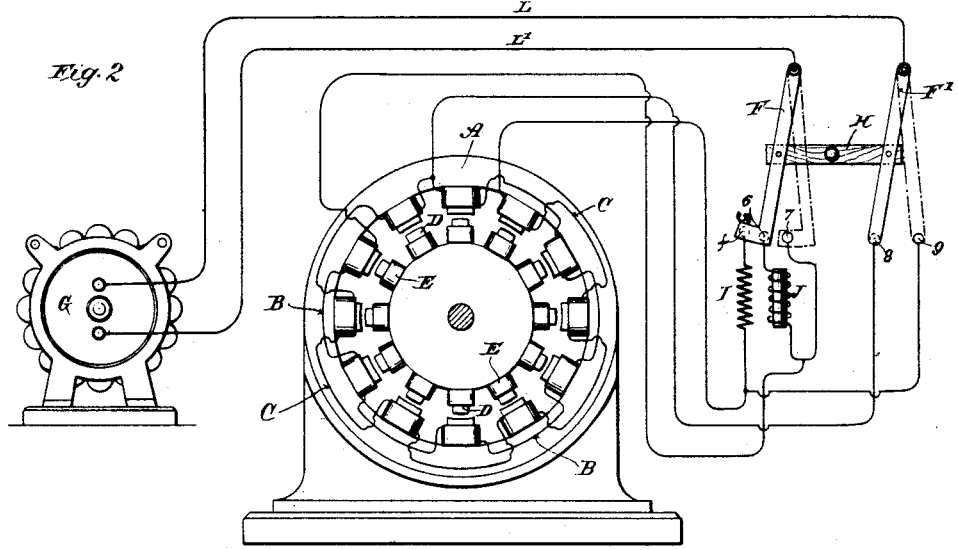
Figure 3:
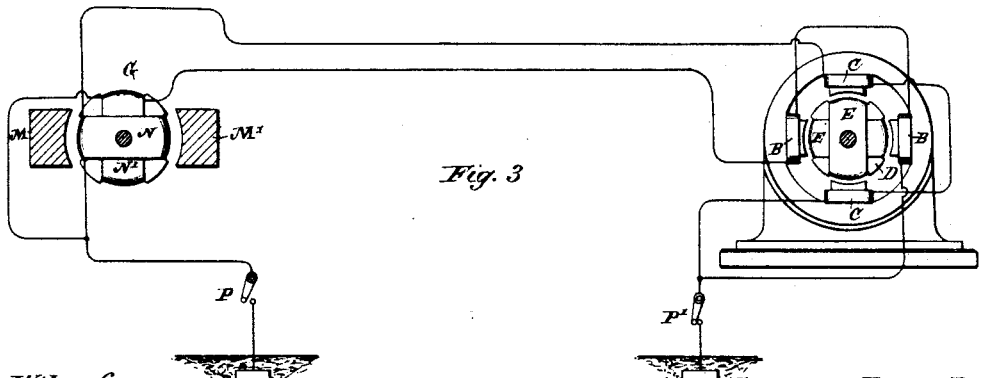

In the drawings, to which I now refer, I have illustrated by the diagrams the general features of construction and operation which distinguish my invention, Figure 1 being drawn to illustrate the details of the plan above set forth, and Figs. 2 and 3 modifications of the same.

Referring to Fig. 1, let A designate the field-magnets of a motor, the polar projections of which are wound with coils B C included in independent circuits, and D the armature with polar projections wound with coils E closed upon themselves, the motor in these respects being similar in construction to those described in my patent, No. 382,279, dated May 1, 1888, but having, by reason of the polar projections on the armature-core or other similar and well-known features, the properties of a synchronizing-motor.

L L' represent the conductors of a line from an alternating-current generator G.

Near the motor is placed a switch the action of which is that of the one shown in the drawings, which is constructed as follows: F F' are two conducting plates or arms, pivoted at their ends and connected by an insulating cross-bar, H, so as to be shifted in parallelism. In the path of the bars F F' is the contact 2, which forms one terminal of the circuit through coils C, and the contact 4, which is one terminal of the circuit through coils B. The opposite end of the wire of coils C is connected to the wire L or bar F', and the corresponding end of coils B is connected to wire L' and bar F; hence if the bars be shifted so as to bear on contacts 2 and 4 both sets of coils B C will be included in the circuit L L' in multiple arc or derivation. In the path of the levers F F' are two other contact-terminals, 1 and 3. The contact 1 is connected to contact 2 through an artificial resistance, I, and contact 3 with contact 4 through a self-induction coil, J, so that when the switch-levers are shifted onto the points 1 and 3 the circuits of coils B and C will be connected in multiple arc or derivation to the circuit L L', and will include the resistance and self-induction coil, respectively. A third position of the switch is that in which the levers F and F' are shifted out of contact with both sets of points. In this case the motor is entirely out of circuit.

The purpose and manner of operating the motor by these devices are as follows: The normal position of the switch, the motor being out of circuit, is off the contact-points. Assuming the generator to be running, and that it is desired to start the motor, the switch is shifted until its levers rest upon points 1 and 3. The two motor-circuits are thus connected with the generator-circuit; but by reason of the presence of the resistance I in one and the self-induction coil J in the other the coincidence of the phases of the current is disturbed sufficiently to produce a progression of the poles, which starts the motor in rotation. When the speed of the motor has run up to synchronism with the generator, or approximately so, the switch is shifted over onto the points 2 and 4, thus cutting out the coils I and J, so that the currents in both circuits have the same phase; but the motor now runs as a synchronous motor, which is well known to be a very desirable and efficient means of converting and transmitting power.

It will be understood that when brought up to speed the motor will run with only one of the circuits B or C connected with the main or generator circuit, or the two circuits may be connected in series. This latter plan is preferable when a current having a high number of alternations per unit of time is employed to drive the motor. In such case the starting of the motor is more difficult and the dead and inductive resistances must take up a considerable proportion of the electro-motive force of the circuits. Generally I so adjust the conditions that the electro-motive force used in each of the motor-circuits is that which is required to operate the motor when its circuits are in series. The plan which I follow in this case is illustrated in Fig. 2. In this diagram the motor has twelve poles and the armature has polar projections D wound with closed coils E. The switch used is of substantially the same construction as that shown in the previous figure. There are, however, five contacts, which I have designated by the figures 5, 6, 7, 8, and 9. The motor-circuits B C, which include alternate field-coils, are connected to the terminals in the following order: One end of circuit C is connected to contact 9 and to contact 5 through a dead resistance, I. One terminal of circuit B is connected to contact 7 and to contact 6 through a self-induction coil, J. The opposite terminals of both circuits are connected to contact 8.

One of the levers, as F, of the switch is made with an extension, $f$, or otherwise, so as to cover both contacts 5 and 6 when shifted into the position to start the motor. It will be observed that when in this position and with lever F' on contact 8 the current divides between the two circuits B C, which from their difference in electrical character produce a progression of the poles that starts the motor in rotation. When the motor has attained the proper speed, the switch is shifted so that the levers cover the contacts 7 and 9, thereby connecting circuits B and C in series. I have found that by this disposition the motor is maintained in rotation in synchronism with the generator. This principle of operation, which consists in converting by a change of connections or otherwise a double-circuit motor or one operating by a progressive shifting of the poles into an ordinary synchronizing-motor may be carried out in many other ways. For instance, instead of using the switch shown in the previous figures, I may use a temporary ground-circuit between the generator and motor, in order to start the motor, in substantially the manner indicated in Fig. 3. Let G in this figure represent an ordinary alternating-current generator with, say, two poles, M M', and an armature wound with two coils, N N', at right angles and connected in series. The motor has, for example, four poles wound with coils B C, which are connected in series and an armature with polar projections D wound with closed coils E E. From the common joint or union between the two circuits of both the generator and the motor an earth-connection is established, while the terminals or ends of the said circuits are connected to the line. Assuming that the motor is a synchronizing-motor or one that has the capability of running in synchronism with the generator, but not of starting, it may be started by the above-described apparatus by closing the ground-connection from both generator and motor. The system thus becomes one with a two-circuit generator and motor, the ground forming a common return for the currents in the two circuits L and L'. When by this arrangement of circuits the motor is brought to speed, the ground-connection is broken between the motor or generator, or both, and ground, switches P P' being employed for this purpose. The motor then runs as a synchronizing-motor.

In describing those features which constitute my invention I have omitted illustrations of the appliances used in conjunction with the electrical devices of similar systems—such, for instance, as driving-belts, fixed and loose pulleys for the motor, and the like; but these are matters well understood.

In describing my invention by reference to specific constructions I do not wish to be understood as limiting myself to the constructions shown; and in explanation of my intent in this respect I would say that I may in such forms of apparatus as I have shown in Figs. 1 and 2 include the dead resistance and self-induction coil in either circuit, or use only a dead resistance or a self-induction coil, as in the various ways shown in my application, No. 293,052, filed December 8, 1888. I may also use any form of switch, whether manual or automatic, that will by its manipulation or operation effect the required change of connections, and in order to secure the necessary difference of phase in the two motor-circuits on starting I may employ any of the known means for this purpose.

I believe that I am the first to operate electro-magnetic motors by alternating currents in any of the ways herein suggested or described—that is to say, by producing a progressive movement or rotation of their poles or points of greatest magnetic attraction by the alternating currents until they have reached a given speed, and then by the same currents producing a simple alternation of their poles, or, in other words, by a change in the order or character of the circuit-connections to convert a motor operating on one principle to one operating on another, for the purpose described.

I do not claim herein of itself the method of or apparatus for operating a motor which forms a part of this invention and which involves the principle of varying or modifying the currents passing through the energizing-circuits, so as to produce between such currents a difference of phase, as these matters are described and claimed by me in other applications, but with the object of securing, broadly, the method as a whole which I have herein set forth.

What I claim is—

1. The method of operating an alternating-current motor herein described by first progressively shifting or rotating its poles or points of greatest attraction and then, when the motor has attained a given speed, alternating the said poles, as described.

2. The method of operating an electro-magnetic motor herein described, which consists in passing through independent energizing-circuits of the motor alternating currents differing in phase and then, when the motor has attained a given speed, alternating currents coinciding in phase, as described.

3. The method of operating an electro-magnetic motor herein described, which consists in starting the motor by passing alternating currents differing in phase through independent energizing-circuits and then, when the motor has attained a given speed, joining the energizing-circuits in series and passing an alternating current through the same.

4. The method of operating a synchronizing-motor, which consists in passing an alternating current through independent energizing-circuits of the motor and introducing into such circuits a resistance and self-induction coil, whereby a difference of phase between the currents in the circuits will be obtained, and then, when the speed of the motor synchronizes with that of the generator, withdrawing the resistance and self-induction coil, as set forth.

NIKOLA TESLA.

Witnesses:
GEO. M. MONRO,
WM. H. LEMON.